United States Patent
McCormick

(10) Patent No.: US 10,351,326 B2
(45) Date of Patent: Jul. 16, 2019

(54) STORAGE OF TEMPERATURE-SENSITIVE ITEMS WITH STABILIZING PELLETS

(71) Applicant: Savsu Technologies LLC, Old Bethpage, NY (US)

(72) Inventor: Bruce McCormick, Sante Fe, NM (US)

(73) Assignee: SAVSU TECHNOLOGIES, LLC, Old Bethpage, NY (US)

( * ) Notice: Subject to any disclaimer, the term of this patent is extended or adjusted under 35 U.S.C. 154(b) by 137 days.

(21) Appl. No.: 14/081,438

(22) Filed: Nov. 15, 2013

(65) Prior Publication Data

US 2014/0138266 A1    May 22, 2014

Related U.S. Application Data

(60) Provisional application No. 61/727,457, filed on Nov. 16, 2012.

(51) Int. Cl.
| | |
|---|---|
| *B65D 81/18* | (2006.01) |
| *B65D 81/09* | (2006.01) |
| *B65D 81/38* | (2006.01) |
| *F25D 3/06* | (2006.01) |
| *F28D 20/00* | (2006.01) |
| *F28D 20/02* | (2006.01) |

(52) U.S. Cl.
CPC ......... *B65D 81/09* (2013.01); *B65D 81/3816* (2013.01); *F25D 3/06* (2013.01); *F28D 20/0056* (2013.01); *F28D 20/02* (2013.01); *Y02E 60/142* (2013.01); *Y02E 60/145* (2013.01)

(58) Field of Classification Search
CPC .. F25D 3/00; F25D 2308/08; F25D 2303/082; F25D 2308/085; B65D 81/18

USPC ................... 62/457.1, 457.2, 3.62
See application file for complete search history.

(56) References Cited

U.S. PATENT DOCUMENTS

| | | | | |
|---|---|---|---|---|
| 1,482,481 A | * | 2/1924 | Phillips | 220/592.14 |
| 3,238,002 A | * | 3/1966 | O'Connell | B65D 81/18 220/560.13 |
| 3,959,982 A | * | 6/1976 | Denis et al. | 62/223 |
| 4,377,075 A | * | 3/1983 | Russo | B65D 81/18 62/372 |
| 4,931,333 A | * | 6/1990 | Henry | B65D 81/03 206/584 |
| 5,355,684 A | * | 10/1994 | Guice | A01N 1/02 62/457.2 |

(Continued)

FOREIGN PATENT DOCUMENTS

| | | | | | |
|---|---|---|---|---|---|
| JP | 2007118972 A | * | 5/2007 | | A23L 3/36 |
| WO | WO-2008014164 A1 | * | 1/2008 | | D01F 1/08 |

*Primary Examiner* — Frantz F Jules
*Assistant Examiner* — Martha Tadesse
(74) *Attorney, Agent, or Firm* — Reising Ethington P.C.

(57) ABSTRACT

Thermally-stabilizing pellets are used in a contents container to stabilize the temperature at which temperature sensitive contents are stored in the container. The pellets provide a thermal buffer between the stored contents and the environment outside the contents container that retards the rate of temperature change of the stored contents. The stored contents do not experience the extremes in temperature variation within a passive or active thermally insulated container when at least partially buried in the pellets. The pellets can also help isolate the stored contents from phase change materials that could thermally damage the stored contents with physical contact.

20 Claims, 2 Drawing Sheets

(56) References Cited

U.S. PATENT DOCUMENTS

| | | | | |
|---|---|---|---|---|
| 5,899,088 A | * | 5/1999 | Purdum | B65D 81/056 62/371 |
| 5,950,450 A | * | 9/1999 | Meyer | C09K 5/066 62/457.9 |
| 6,070,427 A | * | 6/2000 | Fine et al. | 62/371 |
| 6,089,038 A | * | 7/2000 | Tattam | B65D 81/3888 62/371 |
| 6,209,343 B1 | * | 4/2001 | Owen | A01N 1/02 252/67 |
| 6,336,340 B1 | * | 1/2002 | Laby | A61J 1/165 62/371 |
| 6,666,032 B1 | * | 12/2003 | Rickson | A61J 1/165 62/3.6 |
| 6,793,856 B2 | * | 9/2004 | Hartmann | C08J 3/226 264/141 |
| 7,228,712 B1 | * | 6/2007 | Stegenga | C09K 5/066 62/371 |
| 7,849,708 B2 | * | 12/2010 | Goncharko | F25D 3/06 62/371 |
| 7,908,870 B2 | * | 3/2011 | Williams | F25D 3/08 62/530 |
| 8,904,810 B2 | * | 12/2014 | Schabron | F25D 3/08 62/371 |
| 2001/0007323 A1 | * | 7/2001 | Clothier | H05B 6/06 219/621 |
| 2002/0020188 A1 | * | 2/2002 | Sharon | B65D 81/18 62/371 |
| 2005/0035120 A1 | * | 2/2005 | Hull | A45C 11/20 220/23.87 |
| 2008/0082043 A1 | * | 4/2008 | Janssen | 604/68 |
| 2008/0135564 A1 | * | 6/2008 | Romero | B65D 81/3827 220/592.2 |
| 2008/0164265 A1 | * | 7/2008 | Conforti | B65D 81/3823 220/592.2 |
| 2008/0197139 A1 | * | 8/2008 | Goncharko | F25D 3/06 220/592.25 |
| 2009/0233375 A1 | * | 9/2009 | Jarvis | A01N 25/34 436/151 |
| 2011/0217544 A1 | * | 9/2011 | Young | B29C 37/0032 428/327 |
| 2014/0021208 A1 | * | 1/2014 | Anti | A01N 1/0273 220/592.25 |
| 2015/0204601 A1 | * | 7/2015 | Baker | B01L 7/52 62/440 |

* cited by examiner

STORAGE OF TEMPERATURE-SENSITIVE ITEMS WITH STABILIZING PELLETS

This application claims the benefit of U.S. Provisional Application No. 61/727,457, filed Nov. 16, 2012, the entire contents of which are hereby incorporated by reference.

TECHNICAL FIELD

The present disclosure relates generally to storage containers and methods of storing temperature sensitive items.

BACKGROUND

Pharmaceutical products and many biological materials are temperature sensitive, in that freezing may damage the materials and temperatures that are too high may otherwise spoil the materials. Thus, during shipment and storage of these types of materials, they must often be maintained within a particular temperature range. One common range for such materials during shipment and/or storage is 2-8° C. Storage containers for such materials may be active or passive with respect to temperature control. For example, a refrigerator is an active storage container and typically includes a refrigeration unit to extract heat from inside the refrigerator to maintain the desired storage temperature. A styrofoam cooler is an example of a passive storage container that relies on thermally insulating materials to retard heat transfer through the container walls. Passive storage containers are sometimes used with ice or some other type of phase change material inside the container to keep the storage area at a stable temperature.

Both active and passive storage containers experience temperature fluctuations in their respective storage areas. The refrigeration unit of an active container may cycle off and on to maintain the desired temperature in the storage area, with the storage area temperature decreasing during on-cycles and increasing during off-cycles. Compressor-driven refrigeration systems also must be periodically defrosted, which may include heating the evaporator coils inside the refrigerator and an accompanying spike in temperature. The temperature inside some refrigerators can vary by as much as 8-10° C. or more over the course of a day, depending on the ambient temperature outside the refrigerator, the age of the refrigeration equipment, the number of door openings, defrost cycle conditions, the quality of the insulation of the refrigerator, and/or the location within the refrigerator.

In a passive storage container, the temperature in the storage area may vary significantly with location inside the container. For example, if the stored contents are in contact with ice at a temperature of 0° C., the stored contents can quickly fall below 2° C., while other regions of the storage area are warmer. In addition, after any phase change material has completely changed phase, the temperature change inside the container is limited only by the insulative properties of the container walls.

SUMMARY

In accordance with one or more embodiments, a method of thermally stabilizing temperature sensitive items during storage comprises the steps of: placing temperature-sensitive contents in a contents container; and burying at least a portion of the temperature-sensitive contents in thermal pellets.

In accordance with one or more embodiments, a storage system for storing temperature-sensitive contents includes a contents container at least partially filled with thermal pellets, and a thermally-insulated storage container that houses the contents container.

BRIEF DESCRIPTION OF THE DRAWINGS

One or more preferred exemplary embodiments of the invention will hereinafter be described in conjunction with the appended drawings, wherein like designations denote like elements, and wherein.

DETAILED DESCRIPTION

Figure 1:
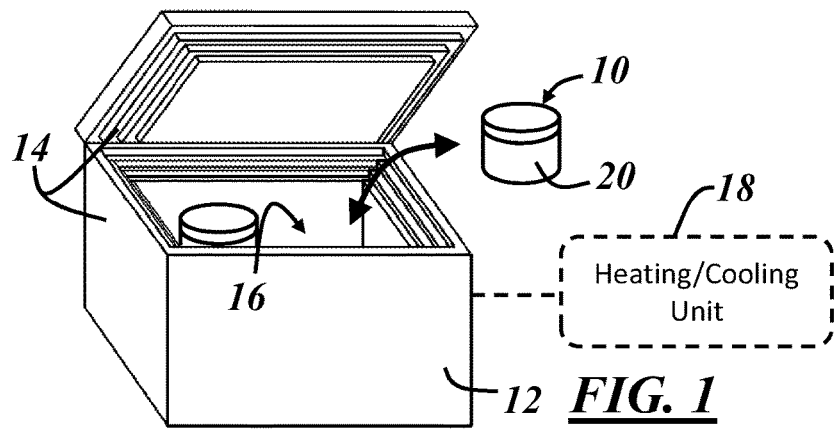
FIG. 1 is schematic view of a thermally-stabilized contents container according to one embodiment, shown in use with an insulated storage container, which is optionally an active storage container.

With reference to FIG. 1, there is shown a thermally-stabilized contents container 10 for storing temperature sensitive items in an active or passive thermally insulated storage container 12 for storage and/or transport. The illustrated storage container 12 includes a plurality of walls 14 that together define a storage area 16 when closed. Each wall 14 may be made from or includes an insulating or super-insulating material, such as expanded polystyrene (EPS), polyurethane, aerogel, etc. The storage container may be configured to hold one or more contents containers 10 and/or ice packs, heat packs, phase change material, or other material designed to affect or stabilize the temperature of the storage area 16. While the examples presented herein are described in the context of maintaining stored contents at typical pharmaceutical storage temperatures (2-8° C.), the teachings presented herein are applicable to storage and temperature stabilization at any temperature. For example, in some applications it may be desirable to maintain biological materials at an incubation temperature, or non-biological materials may be temperature stabilized at some other temperature. The illustrated storage container 12 optionally includes a heating/cooling unit 18 which may include known components and arrangements. When unit 18 is omitted, the storage container 12 is a passive storage container. In addition, the thermally-stabilized contents container 10 described here may be used separately from the storage container 12, such as upon delivery of the contents after shipment, when the contents container can be removed from the storage container and keep the temperature of the contents more stable than previously known. The thermally-stabilized contents container 10 can also retard warming of the temperature-sensitive contents after the container is removed from a refrigerator and while the contents are awaiting use.

Figure 2:
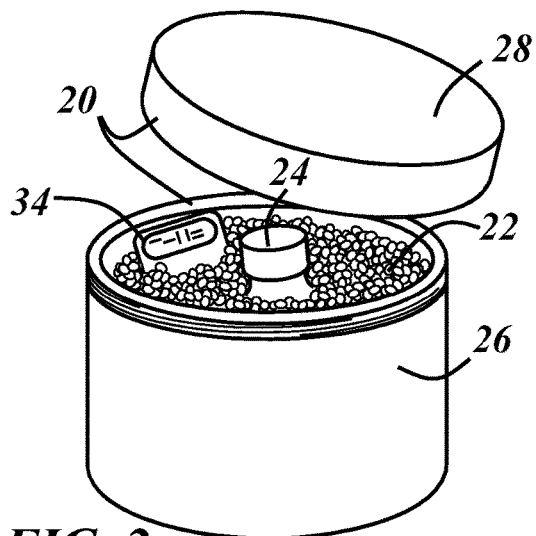
FIG. 2 is an enlarged view of the contents container of FIG. 1, opened to show temperature-sensitive contents surrounded by pellets.
Figure 3:
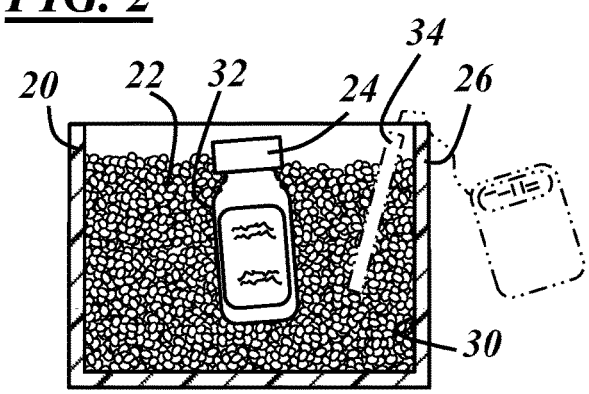
FIG. 3 is a cross-sectional view of the contents container of FIG. 2.

The thermally stabilized contents container 10 is shown in an enlarged view in FIG. 2 and in cross-section in FIG. 3. The contents container 10 includes a container body 20 at least partially filled with thermally-stabilizing pellets 22. As shown, the pellets 22 are in contact with and at least partially surround the stored contents 24, which may be a vial or other container with pharmaceutical or biological material inside. In this particular example, the container body 20 is a two-piece body with a bottom 26 that holds the pellets 22 and the contents 24, and a removable top 28. The container body can be in any shape or form and made from any material. One example is the illustrated two-piece container body 20 constructed from a thermoplastic material such as high-density polyethylene (HDPE), low-density polyethylene (LDPE), polypropylene (PP), or other plastic. The illustrated container body 20 may be made from any non-polymer material as well. In another embodiment, the container body 20 is a plastic bag with a zip-closer, heat-sealed closure, or twist closure, for example. The container body 20 could also be a cardboard box with a tape or adhesive closure. In some embodiments, the container body 20 is open and has no closure. The container body 20 is preferable sufficiently durable to be reused for multiple storage and/or transport cycles.

The pellets 22 are of a suitable shape and size so that, in bulk, a sufficient volume of the pellets can be easily displaced by the stored contents 24 so that the stored contents can be at least partially buried in and surrounded by the pellets as shown. The pellets 22 act as thermal mass in the contents container 10 by retarding the rate of thermal energy transfer between the contents 24 and the area outside of the contents container. Thus, in one embodiment the thermally-stabilizing pellets 22, also referred to as thermal pellets, are made from any material or combination of materials that has a specific heat higher than that of air and that is solid at the desired storage temperature. The pellets 22 preferably also have a relatively low thermal conductivity, as well as relatively low moisture absorption. Several types of plastics are suitable for use as pellets 22. Polyolefins (e.g., HDPE, LDPE, PP) polyamides, polystyrene, polycarbonate, polyesters, and other thermoplastics have specific heats higher than air, generally in a range from about 1.1 to 2.5 J/g-K or higher. Non-polymeric materials such as metals, ceramics, or natural materials may also be used in pellet form. But the low thermal conductivity of polymeric materials combined with their high specific heat values make polymeric pellets preferable. Suitable polymeric pellets have a thermal conductivity of 1.0 W/m-K or lower, and preferably the thermal conductivity of the pellet material is in a range from about 0.2 to 0.5 W/m-K. Polyolefin materials may be preferred due to their hydrophobic nature, relatively low density, and low cost. Pellet hydrophobicity may be advantageous to prevent inadvertent water (e.g., water absorbed from the atmosphere) from being trapped in the contents container where it could promote microbial growth. The pellets 22 can also include a bactericide or other anti-microbial agent blended into the plastic material as an additive and/or coated on the exterior of the pellets.

Plastic materials are widely available in pellet form as injection molding or extrusion grades of material. The shape and size of the individual pellets is generally not limited except that the pellets should be sized to fit in the container body 20 and a substantial portion of the bulk volume of the pellets 22 should be solid material so that the pellets can generally conform to the shape of any contents 24 buried in the pellets. For example, one type of polypropylene pellets has a bulk density of 600 g/L. The density of solid polypropylene is about 900 g/L. Thus, a container full of 600 g/L pellets of this example of polypropylene is about two-thirds solid material and one-third air space between the pellets. The individual pellets 22 may be cylindrical, globular, spherical, ellipsoidal, or any other shape and generally have a relative low aspect ratio from about 1.0 to about 3.0, though other aspect ratios may be suitable. The smallest dimension (diameter or width) of each pellet may range from about 1.0 mm to about 5.0 mm, and the longest dimension may range from about 1.0 mm to about 15.0 mm. In one embodiment, the individual pellets have a width or diameter of 1.0-3.0 mm, on average, and a length of 1.0-3.0 mm on average. These are non-limiting examples of pellet size ranges. Generally, smaller pellets may be preferred to displace as much air as possible from the container body 20, but the pellets should not be so small as to cause problems with the pellets sticking to the contents 24 when removed or so small that the pellets pack together too tightly making them difficult to displace with the contents 24.

As may also be apparent from the figures, the pellets 22 offer the additional advantage of protecting the contents from damage due to physical shock due to the relatively even distribution of forces along the portion of the contents in contact with the pellets 22. The pellets 22 surround the buried portion of the contents in a fluid-like manner. The small size of the pellets 22 allows them to move in a fluid-like flow and take the shape of the container body 20 at an outer volume boundary 30 and the shape of the contents 24 at an inner volume boundary 32.

As shown in FIG. 2, the pellets 22 may also provide a temperature measurement medium in which a temperature recording device 34 can be located. The recording device 34 can be a data logger completely contained inside the contents container 10 as shown, or it can be a thermocouple or other sensor that can be read externally by another device (shown in phantom in FIG. 3). Locating the temperature recording device 34 in the pellets can improve the accuracy of the measurement of the temperature of the contents 24, especially when compared to methods that rely on a measurement of the air temperature surrounding the contents in containers not equipped with thermal pellets 22.

Figure 4:
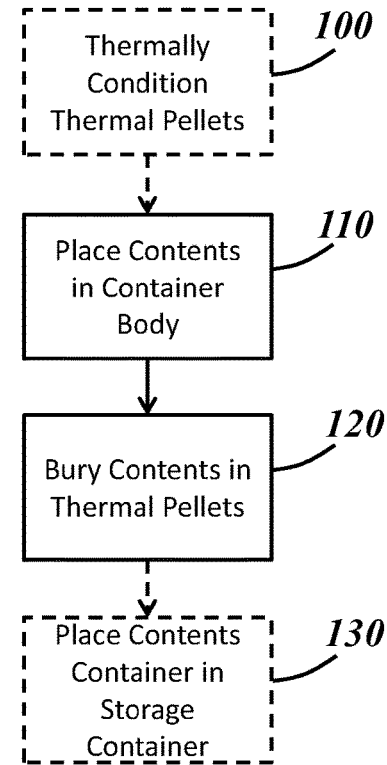
FIG. 4 is a flow chart of an illustrative method of thermally stabilizing temperature-sensitive contents during storage.

FIG. 4 is a flowchart illustrating an embodiment of a method of thermally stabilizing temperature sensitive items during storage. The method includes the step of placing temperature sensitive contents in a contents container (step 110) and burying at least portion of the temperature sensitive contents in thermal pellets (step 120). These steps may be performed in any order. For example, the contents may be placed in the container body, and then the thermal pellets may be poured into the container body to bury some or all of the temperature sensitive contents. Or the container body may be sufficiently filled with thermal pellets, and then the temperature sensitive contents may be buried in the pellets. The method may include the additional step(s) of placing the contents container in a storage container (step 130), such as a refrigerator or insulated storage container, and/or thermally conditioning the thermal pellets prior to the step of burying (step 100). These steps are shown in dashed lines in FIG. 4.

In one embodiment, the thermal pellets are thermally conditioned by causing or allowing the pellets to reach the desired storage temperature. For example, the contents container, including the pellets, may be thermally conditioned by allowing the container to soak inside a refrigerator until the pellets reach a constant temperature—or at least as constant a temperature as the refrigerator is capable of providing. Or the pellets may otherwise be brought to within the desired temperature range (e.g., convection, radiation, etc.). This conditioning step can allow the stored contents to remain in the desired temperature range, even when initially buried in the pellets.

In another embodiment, the contents container, including the thermal pellets and the temperature sensitive contents, are placed in the storage area of a passive storage container with a phase change material such as ice packs. Here, the thermal pellets not only increase the thermal mass of the contents container, to slow the temperature change of the contents, but they also isolate the temperature-sensitive contents from the dangerous effects of the 0° C. ice.

Figure 5:
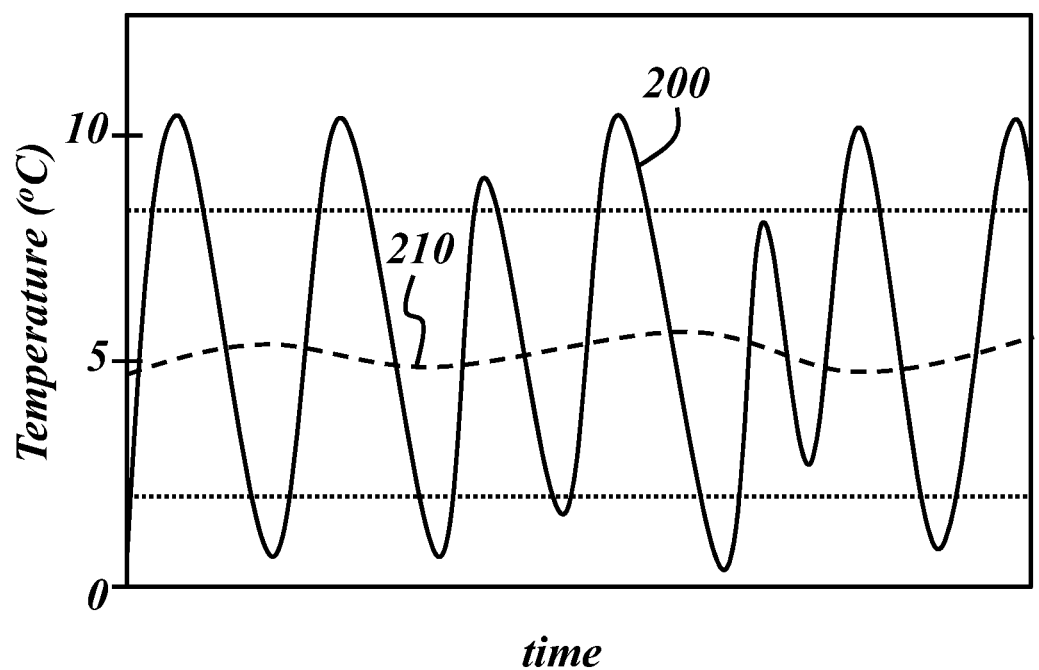
FIG. 5 is a plot of temperature versus time, illustrating a desired effect of thermal stabilization.

FIG. 5 schematically shows the stabilizing effect of the thermal pellets over time.

In this illustration, the temperature inside an active storage container attempting to maintain a temperature between 2° C. and 8° C. is shown as a solid line 200 and the temperature inside the thermally-stabilized contents container stored inside the active storage container is shown as a dashed line 210. This plot is not based on actual data, and is meant only to show the overall effect of the thermal pellets. As shown, the thermal pellets can have a temperature buffering effect, decreasing the overall minimum-to-maximum magnitude of the temperature variation that the stored contents are subjected to with respect to the space inside the active storage container and outside the thermally-stabilized contents container.

It is to be understood that the foregoing is a description of one or more preferred exemplary embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "for example," "for instance," "such as," and "like," and the verbs "comprising," "having," "including," and their other verb forms, when used in conjunction with a listing of one or more components or other items, are each to be construed as open-ended, meaning that that the listing is not to be considered as excluding other, additional components or items. Other terms are to be construed using their broadest reasonable meaning unless they are used in a context that requires a different interpretation.

The invention claimed is:

1. A method of thermally stabilizing temperature sensitive items during storage within a desired storage temperature range, comprising the steps of:
   (a) placing temperature-sensitive contents in a contents container;
   (b) burying at least a portion of the temperature-sensitive contents in thermal pellets contained within the contents container; and
   (c) placing the contents container in a storage area of a separately provided thermally insulated storage container,
   wherein the thermal pellets are made from a hydrophobic material that is solid in the desired storage temperature range, and
   wherein step (b) is performed such that the temperature-sensitive contents are not in contact with a body of the contents container.

2. The method of claim 1, further comprising the step of thermally conditioning the thermal pellets by causing the pellets to reach the desired storage temperature range before step (b).

3. The method of claim 1, wherein the storage container is an active storage container.

4. The method of claim 1, wherein the storage container is a passive storage container.

5. The method of claim 4, wherein the storage container has a phase change material in the storage area with a phase change temperature that is outside of the desired temperature range for the temperature-sensitive contents, and wherein the thermal pellets isolate the temperature-sensitive contents from the phase change material.

6. The method of claim 1, wherein the thermal pellets are plastic pellets.

7. The method of claim 1, further comprising the steps of locating the temperature sensitive contents in the thermal pellets such that thermal pellets substantially surround the contents, the thermal pellets being in contact with the contents on all sides of the buried portion of the contents.

8. The method of claim 7, further comprising the step of shipping the contents container with the temperature-sensitive contents inside the contents container.

9. The method of claim 1, further comprising the step of placing a temperature recording device in contact with the pellets.

10. The method of claim 1, wherein the thermal pellets are shaped and sized so that a volume of the contents container that is occupied by the pellets is at least 60% solid pellet material, with the remainder of the volume of the contents container that is occupied by the pellets being space between individual ones of the pellets.

11. The method of claim 1, wherein the desired storage temperature range is 2° C. to 8° C.

12. The method of claim 1, wherein the thermal pellets include an anti-microbial agent.

13. The method of claim 1, further comprising the steps of: removing the contents container from the thermally-insulated container in which the contents container was placed during step (c), removing the temperature-sensitive contents from the thermal pellets in which at least a portion of the temperature-sensitive contents was buried in step (b), and reusing at least a portion of the contents container or thermal pellets or both by repeating steps (a) through (c) with different temperature-sensitive contents.

14. A storage system for storing temperature-sensitive contents, comprising:
   a contents container at least partially filled with hydrophobic plastic pellets; and
   a thermally-insulated storage container that removably houses the contents container such that the plastic pellets are removed from the thermally-insulated storage container when the contents container is removed from the thermally-insulated storage container,
   wherein the plastic pellets are sized and shaped so that the pellets are suitable for an injection molding or extrusion process.

15. A storage system as defined in claim 14, further comprising a temperature recording device configured to measure a temperature of the plastic pellets during use.

16. A storage system as defined in claim 14, wherein the thermally-insulated storage container is an active storage container.

17. A storage system as defined in claim 14, wherein the thermally-insulated container is a passive storage container.

18. A method of thermally stabilizing temperature-sensitive contents during storage within a desired storage temperature range, comprising the steps of:
   (a) at least partially filling a contents container with plastic pellets;
   (b) placing the temperature-sensitive contents in the contents container, wherein the temperature-sensitive contents include pharmaceutical or biological materials that are damaged outside the desired storage temperature range;
   (c) burying at least a portion of the temperature-sensitive contents in the plastic pellets, wherein the plastic pellets are of a shape and size so that the plastic pellets surround the buried portion of the temperature-sensitive contents in a fluid-like manner to take the shape of a body of the contents container at an outer volume boundary and the shape of the temperature-sensitive contents at an inner volume boundary;
   (d) thermally conditioning the plastic pellets by causing the pellets to reach the desired storage temperature range before step (c); and
   (e) placing the contents container in a storage area of a separately provided thermally-insulated storage container by moving the contents container from a location outside the storage area of the thermally-insulated storage container to a location in the storage area of the thermally-insulated container.

19. The method of claim 1, wherein:
   the desired storage temperature range is defined as being above a temperature below which the temperature-sensitive contents will be damaged by freezing and below a temperature above which the temperature-sensitive contents will be spoiled;
   the thermal pellets are plastic pellets sized and shaped so that the pellets are suitable for an injection molding or extrusion process;
   the contents container includes a closure, the method further comprising the step of enclosing the temperature-sensitive contents and the thermal pellets in the contents container;
   the method further comprises the step of placing the contents container in a storage area of a thermally insulated storage container after the step of enclosing, the storage container having a phase change material in the storage area with a phase change temperature that is outside of said desired temperature range; and
   the thermal pellets are located between and thereby physically isolate the temperature-sensitive contents from the phase change material.

20. The method of claim 18, wherein the plastic pellets are sized and shaped so that the pellets are suitable for an injection molding or extrusion process.

* * * * *